(12) United States Patent
Ban et al.

(10) Patent No.: US 7,532,949 B2
(45) Date of Patent: May 12, 2009

(54) MEASURING SYSTEM

(75) Inventors: Kazunori Ban, Minamitsuru-gun (JP); Makoto Yamada, Minamitsuru-gun (JP)

(73) Assignee: Fanuc Ltd, Minamitsuru-gun, Yamanashi (JP)

( * ) Notice: Subject to any disclaimer, the term of this patent is extended or adjusted under 35 U.S.C. 154(b) by 877 days.

(21) Appl. No.: 11/034,724

(22) Filed: Jan. 14, 2005

(65) Prior Publication Data
US 2005/0159842 A1    Jul. 21, 2005

(30) Foreign Application Priority Data
Jan. 16, 2004    (JP) .............................. 2004-009848

(51) Int. Cl.
*G06F 15/16*    (2006.01)
(52) U.S. Cl. ...................................... 700/245; 345/419
(58) Field of Classification Search ................. 700/245; 382/294, 153; 345/419–427; 356/12–14; 348/42–50; 359/462–477; 352/57–65; 33/20.4, 33/20.2; 353/7–9; 396/324–331
See application file for complete search history.

(56) References Cited
U.S. PATENT DOCUMENTS
5,047,701 A * 9/1991 Takarada et al. ............ 700/246
(Continued)

FOREIGN PATENT DOCUMENTS
JP    02-194302    7/1990
(Continued)

OTHER PUBLICATIONS

Roger Y. Tsai et al., "A New Technique for Fully Autonomous and Efficient 3D Robotics Hand/Eye Calibration", IEEE Transactions on Robotics and Automation, vol. 5, No. 3, Jun. 1989, New York, US, pp. 345-358.

(Continued)

*Primary Examiner*—Dalena Tran
(74) *Attorney, Agent, or Firm*—Drinker Biddle & Reath LLP (57) ABSTRACT

A measuring system which can easily measure a three-dimensional position of a target to be measured using a light receiving device mounted to a manipulator of a robot. When the manipulator is positioned at a first position, a moving process for moving an image of the target imaged by the light receiving device or a camera to a center of a light receiving surface of the camera is executed. Next, the manipulator positioned at the first position is moved, without changing the orientation of the camera, to a second position where the distance between the camera and the target is different to that at the first position. After that, the moving process is executed again. Based on the position of the manipulator after the process, the orientation of a coordinate system $\Sigma v1$ representing the direction of a visual line is calculated. Then, the manipulator is rotated by 180 degree about Z-axis of the coordinate system $\Sigma v1$ and the moving process is executed again. A middle point of the positions of coordinate system $\Sigma v1$ before and after movement of the manipulator is determined as an origin of a coordinate system $\Sigma v2$ representing the orientation and the position of the visual line. The manipulator is inclined relative to Y-axis of the coordinate system $\Sigma v2$ and the moving process is executed again, so as to calculate the three-dimensional position of the target.

12 Claims, 10 Drawing Sheets

U.S. PATENT DOCUMENTS

| | | | |
|---|---|---|---|
| 5,086,401 A * | 2/1992 | Glassman et al. | 700/259 |
| 5,960,125 A * | 9/1999 | Michael et al. | 382/294 |
| 6,349,245 B1 * | 2/2002 | Finlay | 700/245 |
| 6,547,782 B1 * | 4/2003 | Taylor | 606/14 |

FOREIGN PATENT DOCUMENTS

| | | |
|---|---|---|
| JP | 2-198791 | 8/1990 |
| JP | 05-277973 | 10/1993 |
| JP | 07 328971 | 12/1995 |
| JP | 08 047881 | 2/1996 |
| JP | 08 272414 | 10/1996 |
| JP | 10 049218 | 2/1998 |
| JP | 10-63317 | 3/1998 |
| JP | 10/080882 | 3/1998 |
| JP | 2000 131060 | 5/2000 |
| JP | 2001 349707 | 12/2001 |

OTHER PUBLICATIONS

European Patent Office Search Report.
Roger Y. Tsai et al., "A New Technique for Fully Autonomous and Efficient 3D Robotics Hand/Eye Calibration", IEEE Transactions on Robotics and Automation, vol. 5, No. 3, Jun. 1989, pp. 345-358.

* cited by examiner

MEASURING SYSTEM

BACKGROUND OF THE INVENTION

1. Field of the Invention

The present invention relates to a measuring system and a method for measuring a position of a target (a point on an object to be measured) by receiving light on a light-receiving surface of a light-receiving device mounted to a robot.

2. Description of the Related Art

A touchup method is known as a method for determining a position of an object near a robot and, in particular, a position of a target on the object to be measured. This method includes steps of: predetermining a position of a tool center point (TCP) with respect to a coordinate system fixed to an end of an arm of the robot (mechanical interface coordinate system), moving the robot in manual mode such as jog feed so as to accurately coincide TCP with the target (point to be measured), getting position data of the robot so as to determine the position of the target.

Another method is also known in which a robot and a camera are combined. The camera is attached to the end of the arm of the robot. The camera is moved by the robot for stereo view measurement, whereby the position of the target relative to the robot is found. As is known, this method requires a calibration in which a sensor coordinate system generally fixed to a body of the camera is determined and, a position of the sensor coordinate system and a position on an image of the camera Corresponding to the position of the sensor coordinate system are calculated. A detailed explanation of this calibration is omitted since the calibration is well-known in the art.

Further, in the method in which the robot and the camera are combined, a positional relation between the robot and the camera must be calculated previously in addition to the calibration. This calculation is often referred as a combination of the robot coordinate system and the sensor coordinate system. Examples of this are disclosed in following documents: Roger Y. Tsai and Reimar K. Lenz, "A New Technique for Fully Autonomous and Efficient 3D Robotics Hard/Eye Calibration", IEEE Trans. on Robotics and Automation, Vol. 5, No. 3, 1989, pp. 345-358, and Japanese Patent Application Unexamined Publication No. 10-63317.

If both of the calibration and the combination of the coordinate systems has already completed, a visual line directed from the camera to the target can be calculated. Therefore, by moving the camera to two positions and measuring the target, a three-dimensional position of the target relative to the robot can be calculated as an intersection point of two visual lines.

However, the above two methods (i.e., the touchup method and the combination method or the camera and the robot) have problems.

First, in the touchup method using the robot, it is difficult to measure with high precision because of a possible setting error of TCP relative the robot (or the mechanical interface) and a positioning error of TCP to the target during the touchup operation. In both of setting and positioning of TCP, an operator must move the robot by jog feed and coincide TCP of the robot with a desired position. In this case, the setting and the positioning have different precision levels depending on the orientation of the robot when setting and positioning are carried out or depending on operator's skill. Particularly, because positioning is carried out based on visual measurement, even a skilled operator cannot achieve high-precision work. Further, as a TCP is approached or contacted to the target, interference (or damage of TCP and/or the object to be measured) may occur.

On the other hand, the method in which the camera is attached to the end of the arm of the robot and is moved by the robot for stereo view measurement, is based on measurement of the target by the camera. Therefore, the precision level of the method is stable by eliminating a factor including a human error such as visual inspection and the security of the method is high because the method uses non-contact type measurement. However, as described above, the combination of the coordinate systems in the calibration is required and, the effort of operation required for the calibration and its preparations is by no means small. The reason for this will be briefly explained with referring to FIG. 11.

Figure 11:
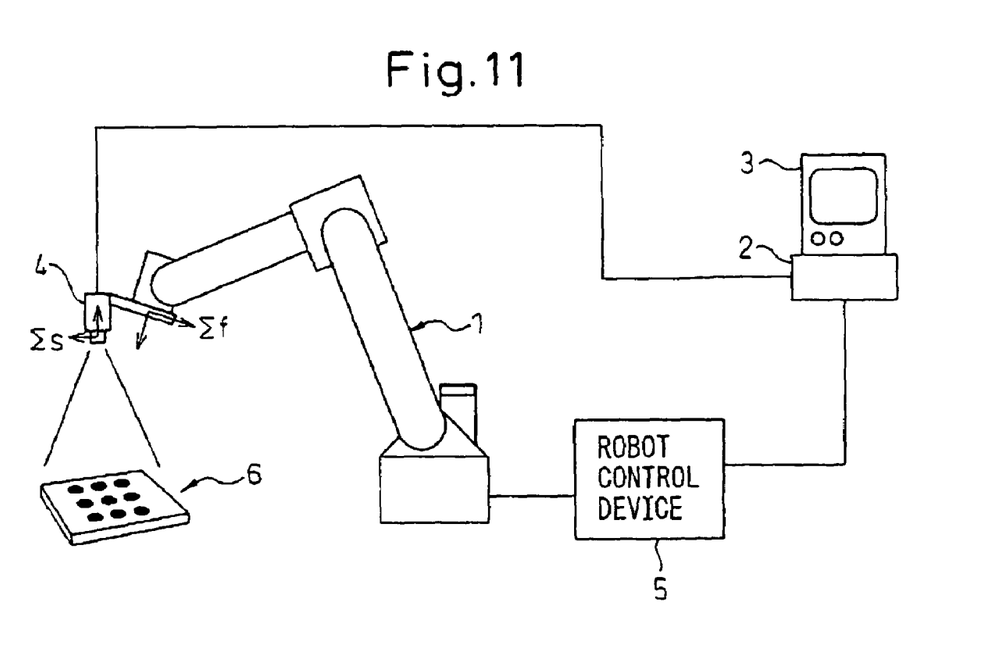
FIG. 11 is a diagram of a typical arrangement used in a calibration of prior art.

FIG. 11 shows a typically arrangement used for the calibration of prior art. A robot denoted by numeral 1 is controlled by a robot control device 5. A camera 4 is attached to around the end of the arm of the robot 1. The camera 4 is connected to an image processing unit 2 including a monitor 3 having a LCD or a CRT. Numeral 6 denotes a fixture shaped like a plate prepared for the calibration or a calibration plate. For example, the calibration plate 6 has a dot pattern including a known array of dots. The image of the calibration plate is taken by the camera 4 and is analyzed by the image processing unit 2. Then, the sensor coordinate system is determined and, parameters indicating the position of the sensor coordinate system and the position on the image of the camera corresponding to the position of the coordinate system are calculated as calibration data and are stored.

Next, the coordinate systems regarding the robot and the camera are combined based on the conventional technique such as described above. Concretely, using the example of FIG. 11, matrix data representing relative positional relation between the sensor coordinate system $\Sigma s$ and the mechanical interface coordinate $\Sigma f$ of robot 1 are obtained. Such a series of operations requires complicated preparations and the exclusive calibration plate 6. Further, in general, a light receiving part (for example, CCD array) or an imaging lens of the camera may have a geometric distortion. In particular, a lens often has a significant distortion. The distortion of the lens is larger at the perimeter of the lens, therefore, calculation of the visual line from a focal point of the lens to the target may include a small or a large error, depending on the position of the target on the image.

SUMMARY OF THE INVENTION

Accordingly, an object of the present invention is to provide a measuring system for measuring the target using the camera or an alternative PSD (position sensitive detector) mounted around the end of a manipulator or the robot arm and to carry out measurement without the complicated preparations and the exclusive calibration plate. Also, the invention tends not to be influenced by the geometric distortion of the lens or the light receiving device for imaging.

The basic characteristic of the invention is to determine the positional relation between the manipulator and the visual line of the camera, by combining following operations; receiving the image of the target on the light receiving surface of the light receiving device (typically the camera or the PSD) attached to around the end of the manipulator, moving the manipulator so as to position the image of the target at a predetermined position (for example, the center of the image of the camera or an origin of the PSD), determining the position of the manipulator and, moving the manipulator so as to change the orientation of the light receiving device. Once the positional relation is determined, a three-dimensional position of the target may be calculated by imaging the target from two points using the light receiving device, based on a principle of stereo measurement.

According to one aspect of the present invention, there is provided a measuring system for measuring a position of a target to be measured relative to a robot having a manipulator, the measuring system comprising: a light receiving device mounted to the manipulator; a control device for positioning the manipulator to an initial position; and an image processing unit for calculating a position of the target on a light receiving surface of the light receiving device imaged on the light receiving surface; the control device comprising: a first arithmetic part for calculating a distance of movement of the manipulator, by means of which the position of the target on the light receiving surface calculated by the image processing unit coincides with a predetermined reference point on the light receiving surface; a drive control part for moving the manipulator according to the distance of movement; a second arithmetic part for calculating a position and an orientation of a visual line of the light receiving device relative to a robot coordinate, based on position data of the manipulator with respect to a plurality of the initial position; and a third arithmetic part for calculating a three-dimensional position of the target relative to the robot coordinate, based on the position and the orientation of the visual line.

Preferably, the reference point on the light receiving surface is positioned generally at a center of the light receiving surface.

The measuring system may be further include a judgment part for judging, after movement of the manipulator and before storing of the position of the manipulator, that the position of the target imaged on the light receiving surface of the light receiving device coincides with the reference point when the distance between them is within a predetermined error range. Therefore, it is ensured that the position of the target on the light receiving surface of the light receiving device coincides with the reference point on the light receiving surface.

Further, the position of the manipulator after movement may be reset as the initial position when the judgment part judges that the position of the target does not coincide with the reference point on the light receiving surface. Therefore, it is further ensured that the position of the target on the light receiving surface of the light receiving device coincides with the reference point on the light receiving surface, by repeating a movement of the robot.

The second arithmetic part may calculate the orientation of the visual line of the light receiving device relative to the robot coordinate based on at least two positions of the manipulator, the two positions being determined such that the orientations of the light receiving device at the two positions are same each other and the distances between the light receiving device and the target at the two positions are different with each other. Therefore, there is provided an embodiment for calculating the orientation of the visual line of the light receiving device relative to the robot.

The second arithmetic part may calculate the position of the visual line of the light receiving device relative to the robot coordinate based on the orientation of the visual line and at least two positions of the manipulator, the two positions being determined by changing the orientation of the light receiving device by a motion including a rotation about an axis parallel to the orientation of the visual line. Therefore, there is provided an embodiment for calculating the position of the visual line of the light receiving device relative to the robot.

The third arithmetic part may calculate the three-dimensional position of the target relative to the robot coordinate based on the orientation and the position of the visual line and at least two positions of the manipulator, the two positions being determined by changing the orientation of the light receiving device by a motion including a rotation about an axis perpendicular to the orientation of the visual line. Therefore, there is provided an embodiment for calculating the three-dimensional position of target.

The light receiving device may be detachably mounted around the end of the manipulator, whereby the light receiving device may be attached around the end of the manipulator when measurement is carried out and may be detached after the measurement.

The light receiving device may be detachably mounted around the end of the manipulator, whereby the robot may be used for measurement of a position of an object to be measured relative to robot by attaching the light receiving device around the end of the manipulator and, after the measurement, the robot may be used for an application other than the measurement by detaching the light receiving device.

The light receiving device may be a camera for imaging a two-dimensional image, or a position sensitive detector for calculating a center of gravity of a distribution of a received light.

According to another aspect of the present invention, there is provided a measuring method for measuring a position of a target to be measured relative to a robot having a manipulator, the method comprising: preparing a light receiving device mounted to the manipulator; positioning the manipulator to an initial position; calculating a position of the target on a light receiving surface of the light receiving device imaged on the light receiving surface; calculating a distance of movement of the manipulator, by means of which the position of the target on the light receiving surface coincides with a predetermined reference point on the light receiving surface; moving the manipulator according to the distance of movement; calculating at least one of a position and an orientation of a visual line of the light receiving device relative to a robot coordinate, based on position data of the manipulator with respect to a plurality of the initial position; and calculating a three-dimensional position of the target relative to the robot coordinate, based on at least one of the position and the orientation of the visual line.

BRIEF DESCRIPTION OF THE DRAWINGS

The above and other objects, features and advantages of the present invention will be made more apparent by the following description of the preferred embodiments thereof, with reference to the accompanying drawings, wherein.

DETAILED DESCRIPTION

Figure 1:
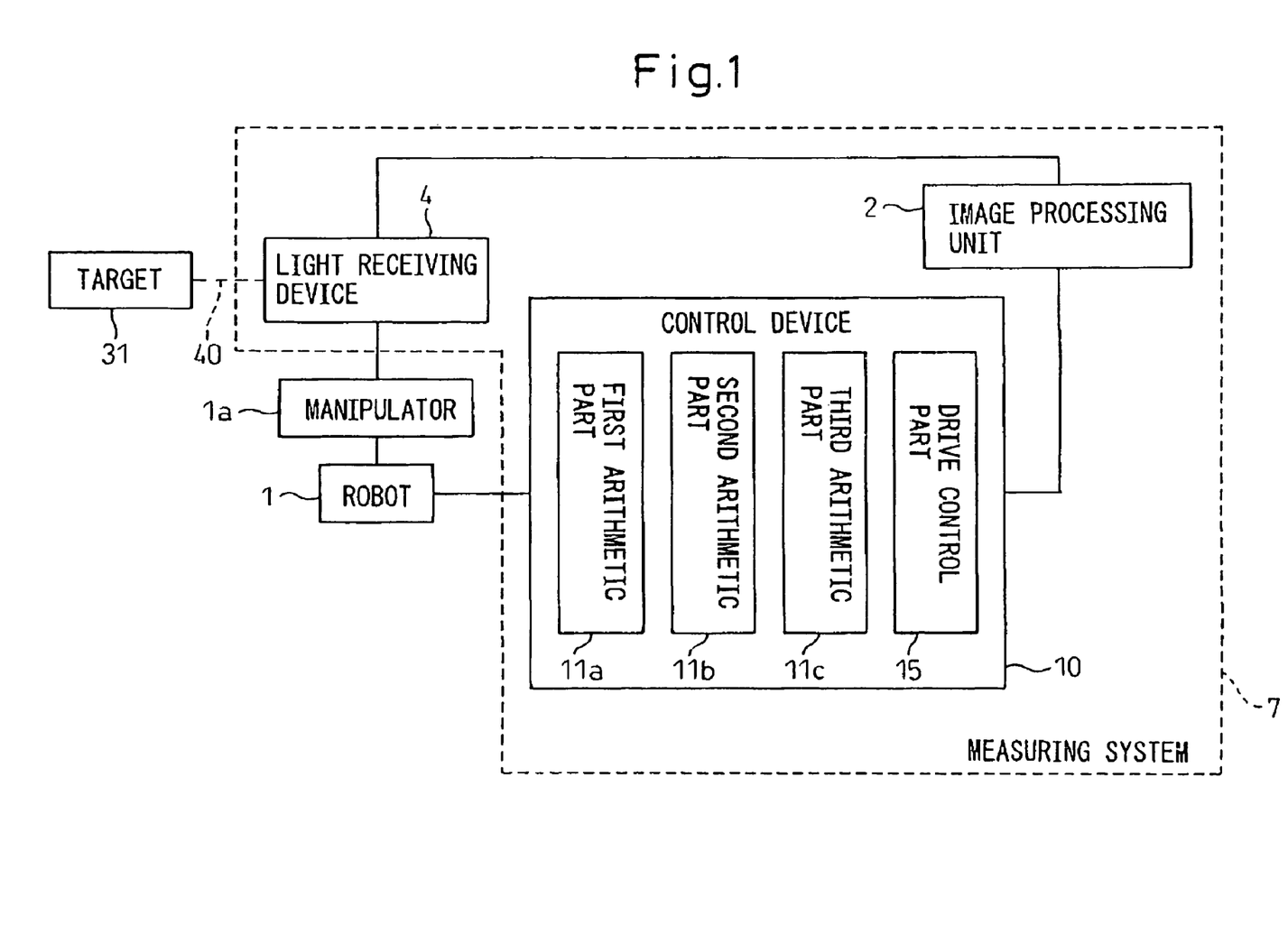
FIG. 1 is a block diagram showing a schematic configuration of a measuring system according to the present invention.

FIG. 1 is shows a schematic configuration of a measuring system according to the present invention. A measuring system 7 for measuring a position of a target 31 to be measured relative to a robot 1 having a manipulator 1a includes a light receiving device 4 mounted to the manipulator 1a, a control device 10 for positioning the manipulator 1a to an initial position; and an image processing unit 2 for calculating a position of the target 31 on a light receiving surface of the light receiving device 4 imaged on the light receiving surface. The control device 10 includes a first arithmetic part 11a for calculating a distance of movement of the manipulator 1a, by means of which the position of the target 31 on the light receiving surface calculated by the image processing unit 2 coincides with a predetermined reference point on the light receiving surface, a drive control part 15 for moving the manipulator 1a according to the distance of movement, a second arithmetic part 11b for calculating at least one of a position and an orientation of a visual line 40 of the light receiving device relative to a robot coordinate, and a third arithmetic part 11c for calculating a three-dimensional position of the target 31 relative to the robot coordinate based on at least one of the position and the orientation of the visual line 40. In a following embodiment, a main CPU 11 executes the functions of the first, the second and the third arithmetic part 11a, 11b and 11c.

Figure 2:
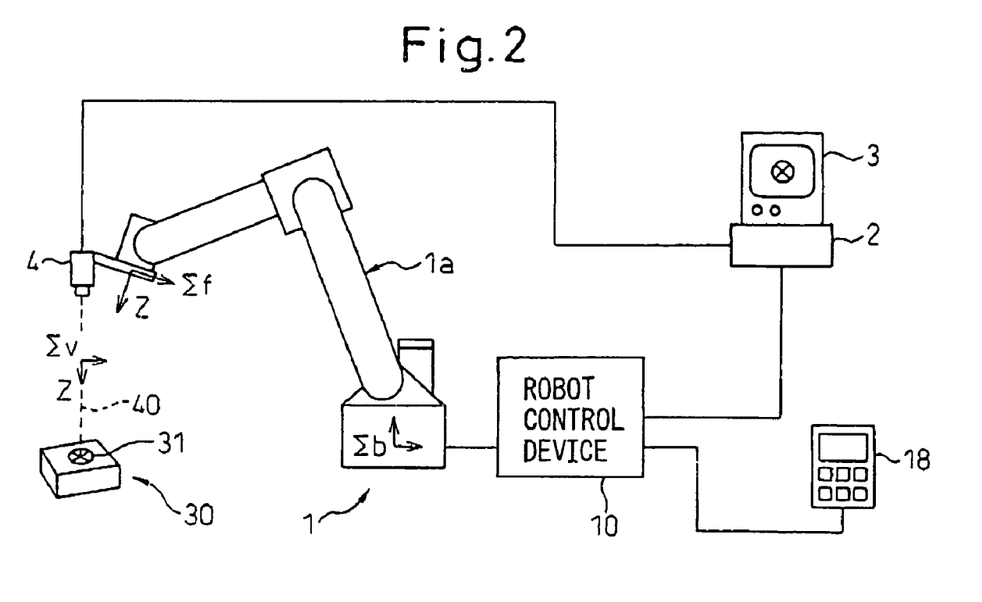
FIG. 2 is a total configuration diagram of one embodiment according to an embodiment of the invention.

An embodiment of the invention will be described with reference to FIGS. 2-10. First, FIG. 2 shows a total configuration of the embodiment of the invention. The light receiving device 4 (for example a camera) is mounted around the end of the manipulator 1a of the robot 1. The camera 4 may be a known CCD camera having a function for detecting a two-dimensional image of an object on a light receiving surface or a CCD array surface by imaging. The camera 4 is connected to a image processing unit 2 having a monitor 3 such as a LCD or a CRT. A numeral 30 denotes an object positioned around the robot 1. The relative position of the object 30 to the robot 1 is to be calculated and a target or a point 31 to be measured therefor is arranged on the object 30. The target 31 may be a shape characteristic of the object 30 or a reference mark arranged on the object for measurement. As described later, the target 31 is imaged by the camera 4 and the image of the target 31 is analyzed by the image processing unit 2. A visual line denoted by a numeral 40 is determined as a straight line extending from a representative point of the camera 4 (for example, a center of the light receiving surface of the camera) to the target 31 via a focal point of an imaging lens of the camera 4. The monitor 3 may be a LCD of a CRT integrated with the image processing unit 2 and, may indicate a desired image at need.

Figure 3:
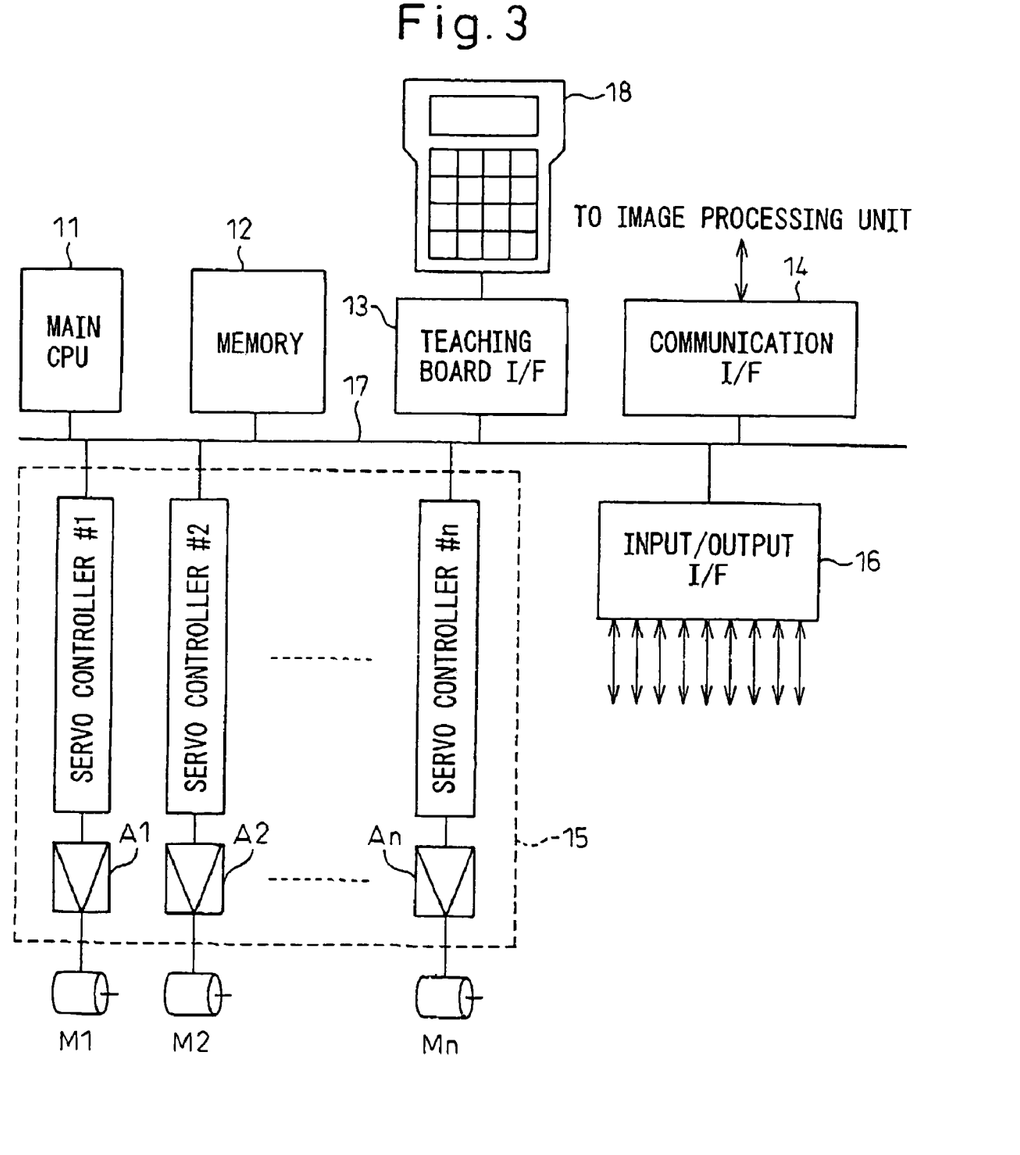
FIG. 3 is a block configuration diagram of a robot used in the embodiment.

The robot 1 may be a conventional typical robot and has a robot control device 10 having a block configuration as shown in FIG. 3. The robot control device 10 has a main CPU (a main central processing unit; hereinafter, simply referred to as a CPU) 11, a storage or a memory 12 consisting of a RAM (random access memory), a ROM (read-only memory) and a non-volatile memory, a teaching board interface 13, a communication interface 14, a drive control part of a servo control unit 15 and an input/output interface 16 for external units, which are connected each other in parallel via a bus 17.

A teaching board 18 connected to the teaching board interface 13 may have the usual display functions. An operator prepares, corrects, and registers a motion program for the robot by manually operating the teaching board 18. The operator also sets various parameters, operates the robot based on the taught motion program, and jog feeds, in the manual mode. A system program that supports the basic function of the robot 1 and the robot control device 10 is stored in the ROM of the memory 12. The motion program (for example, a spot welding) of the robot taught according to the application and relevant set data are stored in the non-volatile memory of the memory 12.

A program and parameters used to carry out processes (for movement of the manipulator to calculate the visual line and for communication with the image processing unit therefor) as described later are also stored in the non-volatile memory of the memory 12. The ROM of the memory is 12 is used for a storage area to temporarily store various data processed by the CPU 11. The servo control unit 15 has servo controllers #1 to #n, where n is a total number of axes of the robot, and n is assumed to be equal to 6 in this case. The servo control unit 15 receives a shift command prepared through operations (such as a path plan preparation, and interpolation and an inverse transformation based on the plan) to control the robot. The servo control unit 15 outputs torque commands to servo amplifiers A1 to An based on the shift command and feedback signals received from pulse coders not shown belonging to the axes. The servo amplifiers A1 to An supply currents to servomotors of the respective axes based on the torque commands, thereby driving the servomotors. The communication interface 14 is connected to the image processing unit 2 shown in FIG. 2. The robot control device 10 exchanges commands relevant to measurement and measured data described later with the image processing unit 2 via the communication interface 14.

Figure 4:
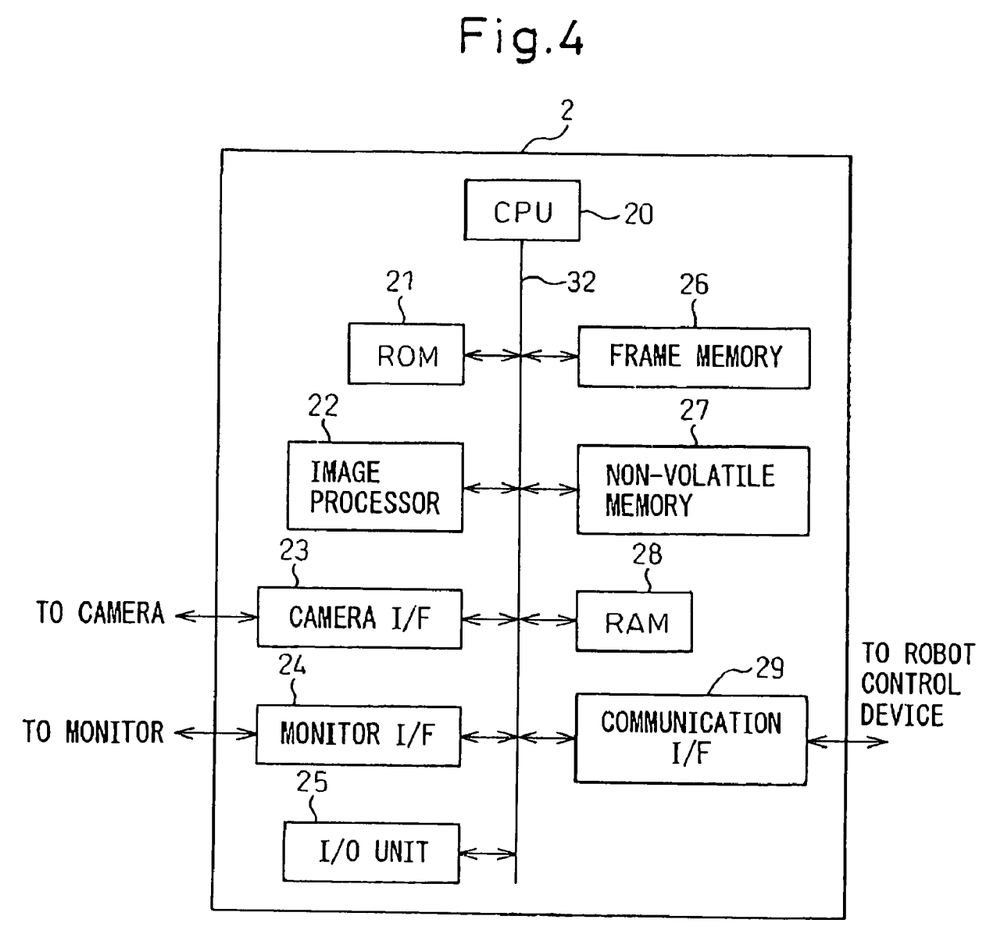
FIG. 4 is a block configuration diagram of an image processing unit.

The image processing unit 2 has a block configuration as shown in FIG. 4. The image processing unit 2 has a CPU 20 including a microprocessor, and also has a ROM 21, an image processor 22, a camera interface 23, a monitor interface 24, an input/output (I/O) unit 25, a frame memory (i.e., an image memory) 26, a non-volatile memory 27, a RAM 28 and a communication interface 29, that are connected to the CPU 20 via a bus line 32.

A camera as an imaging unit, which is the camera 4 shown in FIG. 2 in this case, is connected to the camera interface 23. When the camera receives an imaging command via the camera interface 23, the camera picks up an image using an electronic shutter function incorporated in the camera. The camera sends a picked-up video signal to the frame memory 26 via the camera interface 23, and the frame memory 26 stores the video signal in the form of a grayscale signal. A monitor, which is the monitor 3 shown in FIG. 2 in this case, is connected to the monitor interface 24. The monitor displays images currently picked up by the camera, past images stored in the frame memory 26, or images processed by the image processor 22, according to need.

The image processor 22 analyses the video signal of the image of the target 31 stored in the frame memory 26 and, a three-dimensional position of the target is obtained, as described later in detail. A program and parameters for this purpose are stored in the non-volatile memory 27. The RAM 28 temporarily stores data that the CPU 20 uses to execute various processing. The communication interface 29 is connected to the robot control device via the communication interface 14 at the robot control device side.

A plurality of coordinate systems is shown in FIG. 2. As shown, Σv indicates a coordinate system including a visual line 40 extending from a representative point (for example a center of the light receiving surface) of the camera 4 to the target 31 via the focal point of the imaging lens of the camera 4. The origin of the coordinate system Σv is positioned on the visual line 40 and one axis of the coordinate system (for example, Z axis) coincides with the visual line 40. Also, a coordinate system associated with the base of the robot and a mechanical interface coordinate system are indicated by Σb and Σf, respectively. In this embodiment, the mechanical interface coordinate system Σf is determined as a coordinate system including a representative point of the manipulator. The three-dimensional position of the target 31 relative to the coordinate system Σf is calculated, as described below.

At any time, the calculated three-dimensional position may be converted into a three-positional position relative to the robot coordinate system Σb, based on the positional relation between the coordinate systems Σb and Σf, i.e., using a known coordinate transformation method.

Although the light receiving device in the embodiment of the invention is described as the CCD camera for imaging a two-dimensional image of the object, the light receiving device may be another device such as a CMOS camera having substantially same functions as the CCD, otherwise, may be a position sensitive detector (PSD) for calculating a (two-dimensional) position of a center of gravity of a distribution of received light when the target 31 may be considered as a point light source. When the CCD camera is replaced with such an alternative device, of course, the image processing unit 2 is replaced with another unit being adapted to the alternative device. For example, when the PSD is used, a processing unit having a function for calculating the (two-dimensional) position of the center of gravity of the distribution of received light by processing an output signal from the PSD is used.

Hereinafter, an example of a process for the three-dimensional position of the target 31 according to the invention will be described. Although the light receiving device is the (CCD) camera connected to the image processing unit 2, the camera and the image processing unit may be replaced other light receiving device and signal processing unit, respectively, as described above. The entire process executed in the embodiment is shown in a flowchart of FIG. 10 and now will be described with reference to the flowchart.

Steps T1 and T2

In the invention, it is a basic process that the position of the target 31 on the light receiving surface of the light receiving device is moved to a predetermined point or a reference point on the light receiving surface in order to obtain data of the visual line 40 without using a calibration of prior art.

Figure 10:
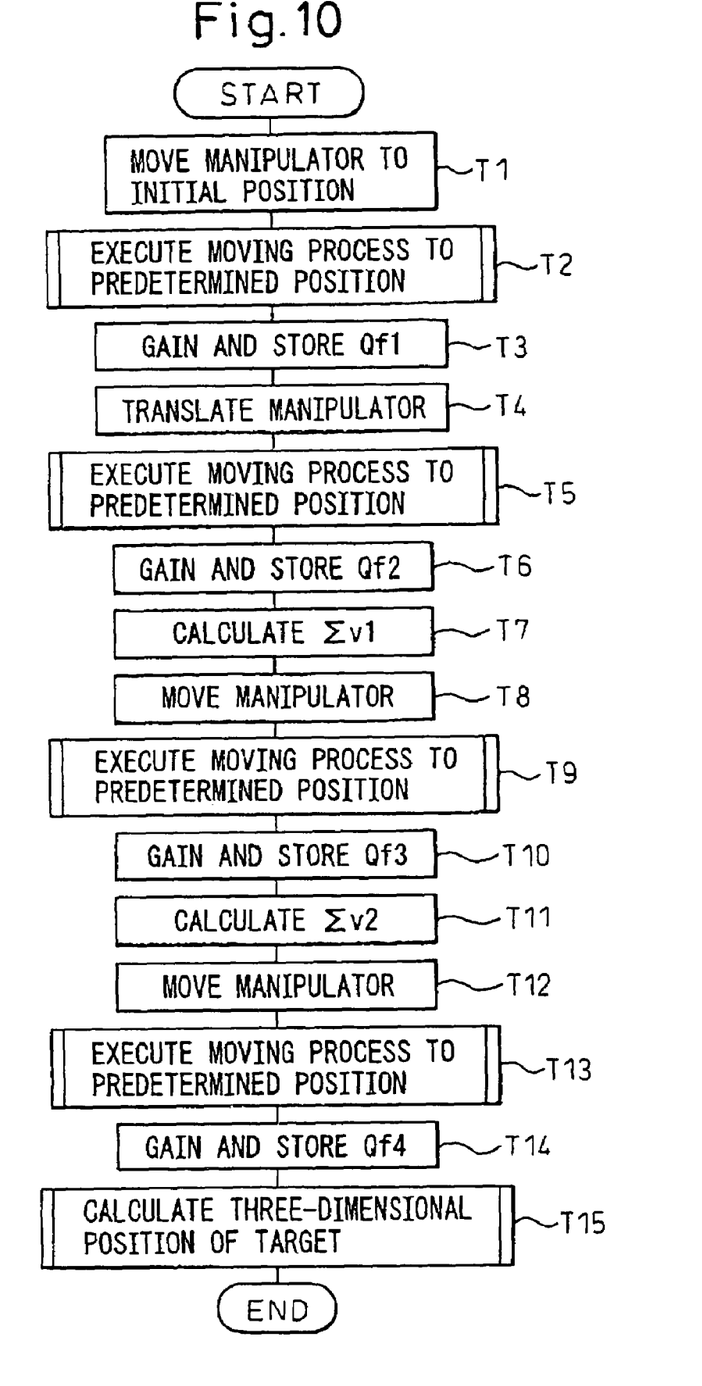
FIG. 10 is a flowchart showing an outline of the entire process executed in the embodiment.

In step T1, the manipulator 1a of the robot 1 is moved to an initial position where the visual field of the camera 4 includes the image of the target 31. Next, in step T2, a moving process to a predetermined position or a reference position is executed. In the moving process, the light receiving device is moved such that the position of the target 31 on the light receiving surface is moved and coincides with the reference point (or come to a point where the distance between the point and the reference point is within a predetermined range).

Figure 5:
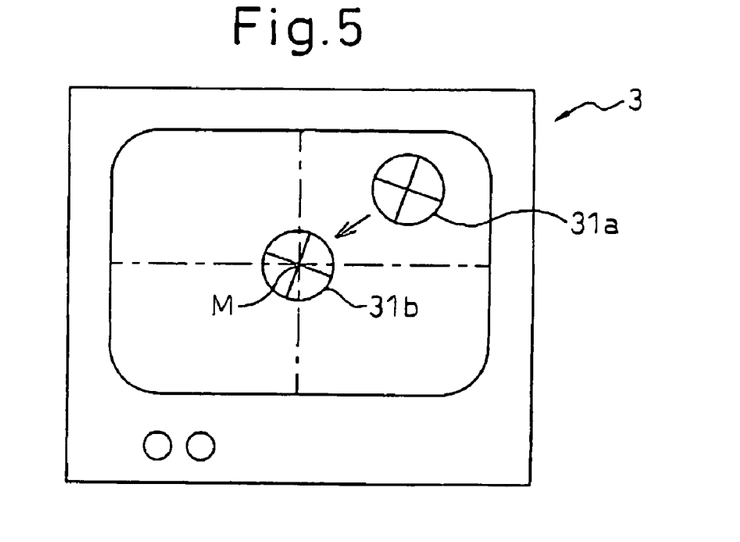
FIG. 5 is a diagram of the monitor showing movement of the target to the center point of the light receiving surface of the light receiving device.

In the embodiment, the reference point is a center point of the light receiving surface (or a CCD array). FIG. 5 shows movement of the image the target 31 to the center point of the light receiving surface using a display of the monitor 3. The display of the monitor 3 is configured such that a center M of the display corresponds to the center of the light receiving device of the camera 4.

It is assumed that the image of the target 31 is positioned at a point denoted by 31a, as shown in FIG. 5, when the manipulator 1a is positioned to the initial position. In this case, the manipulator 1a should be moved such that the image 31a on the display is moved to lower-left toward a point M. However, as the positional relation between the manipulator 1a and the camera 4 is unknown before movement of the manipulator, the direction along which the manipulator 1a should be moved cannot be determined based on the position of the target on the display. Therefore, it must be previously determined how the manipulator 1a should be moved so as to move the image 31a of the target 31 to a desired point (or the point M in this case).

Concretely, the manipulator is moved in three directions (i.e.; X, Y and Z axes) of the mechanical interface coordinate system Σf in FIG. 2 and, the movement of the image 31a of the target 31 corresponding to the movement of the manipulator is observed, whereby the relation between the direction of the movement of the manipulator 1a and the direction of the movement of the image of the target on the display and, the relation between the distance of the movement of the manipulator 1a and the distance of the movement of the image of the target on the display may be determined. If this procedure is executed after the camera 4 is mounted or fixed around the end of the manipulator 1a, it is not necessary to execute the procedure afterward. Although the position and the orientation of the target on the coordinate system Σf during imaging is changed by movement of the manipulator 1a, the positional relation between the coordinate system Σf and (the light receiving surface of) the camera 4 is never changed so far as the setting condition of the camera 4 on the manipulator 1a is not changed.

As it is known that the determination of the relative direction and the distance ratio of the movement of the manipulator and the target on the display by the above procedure, the detailed description regarding the procedure is omitted. It is assumed that the above procedure or the preparation has already been completed in following steps.

Figure 9:
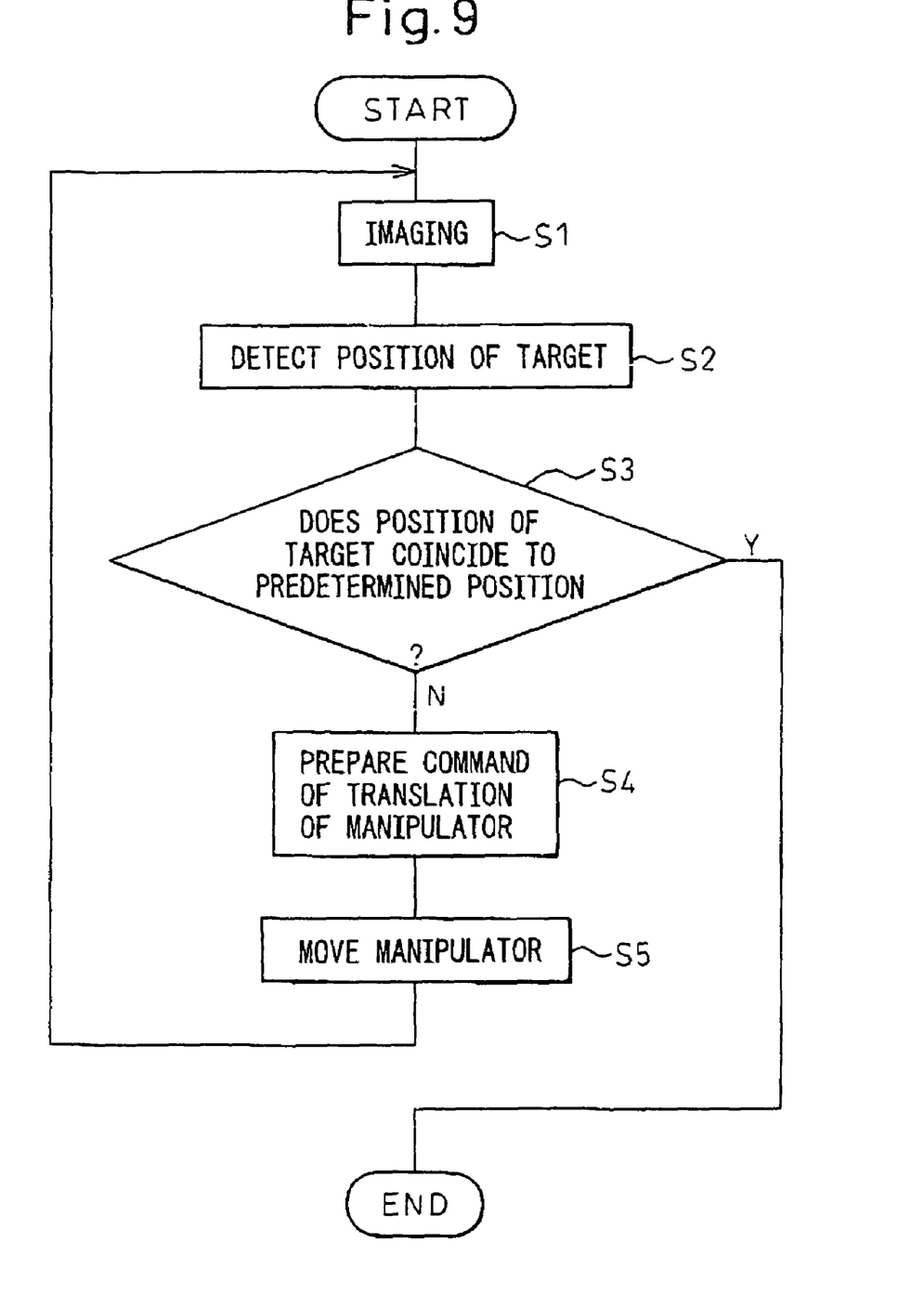
FIG. 9 is a flowchart showing an outline of the process for moving a predetermined point.

An example of a process for coinciding the image 31a of the target imaged by the camera with the reference point M on the display is indicated in a flowchart shown in FIG. 9. Steps of the flowchart will be described below.

Step S1

The target 31 to be measured is imaged, whereby the image 31a as shown in FIG. 5 is obtained.

Step S2

The image processing unit 2 calculates the position of the target 31 (or the position of the image 31a) on the display.

Step S3

The main CPU 11 or a suitable judgment part judges whether the position calculated in step S2 coincides with a predetermined point (the point M in this case) or not. For example, if the distance between the point M and the image 31a on the display is equal to or smaller than a predetermined threshold (δimage), the CPU 11 judges this situation as "coincidence" and the process is stopped. Contrarily, if the distance is larger than the threshold (δimage), the CPU 11 judges as "discordance" and the process is progressed to step S4. The distance on the display may be calculated, for example, by counting a number of square picture elements.

Step S4

A command of translation of robot for moving the image 31a of the target on the display to the point M is prepared. In this case, the command of translation means a command of movement for moving the manipulator such that the orientation of the manipulator or the orientation of the coordinate system Σf is fixed relative to the robot coordinate system Σb.

Step S5

The manipulator 1a is moved based on the command of translation prepared in step S4. The process is returned to step S1 after the movement of the manipulator. A cycle of steps described above is repeated until the judgment by the CPU 11 become "coincide" in step S2.

Step T3

When the above process for movement to the reference point is completed, i.e., when the manipulator is moved from the initial position where the image of the target is indicated by 31a to the position where the image is indicated 31b which coincides with the center point M, a position Qf1 of the coordinate system Σf at that time relative to the robot coordinate system Σb is obtained and stored.

Step T4

Next, the orientation of the visual line 40 is calculated. The visual line 40 is a straight line extending from the point M on the receiving surface of the camera corresponding to the center of the display to target 31 to be measured via the center point of the imaging lens. In the embodiment, the direction of the straight line relative to the coordinate system Σf representing the mechanical interface of the robot is calculated. To this end, first, the manipulator 1a is translated by a process of step T4.

Figure 6:
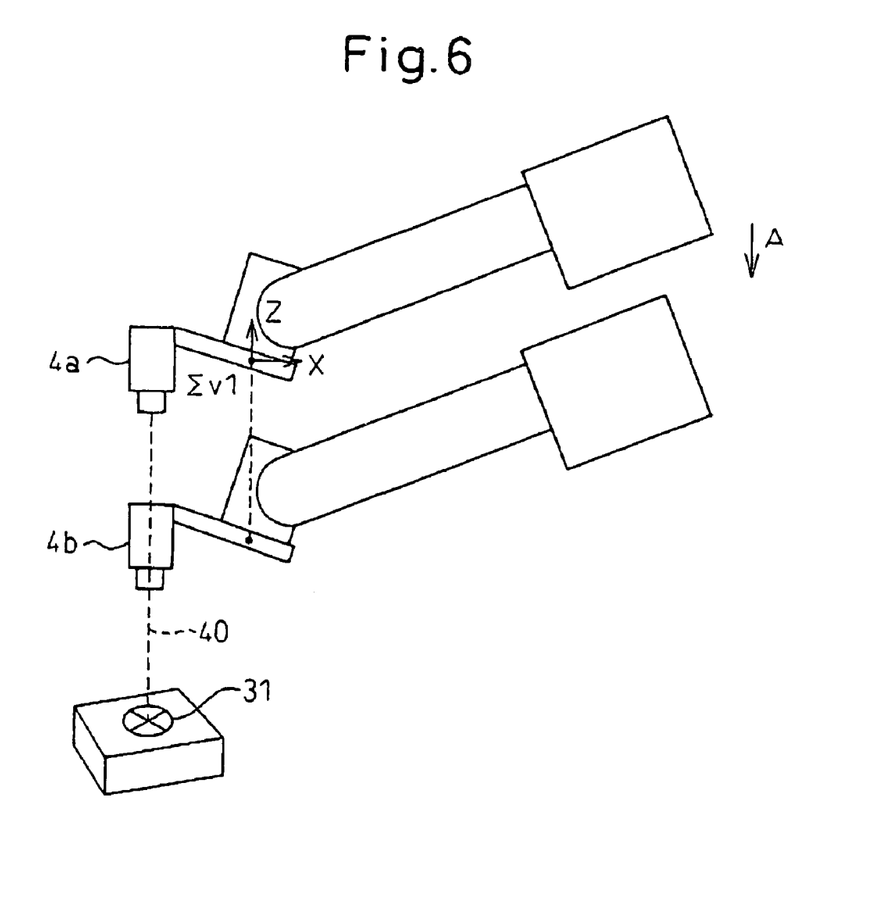
FIG. 6 is an explanatory diagram of the process of step T4.

FIG. 6 is an explanatory diagram regarding the process. A coordinate system Σv1 is set for calculating the orientation of the visual line 40 and satisfies following conditions:

(i) The coordinates Σf and Σv1 have a same origin.

(ii) The direction of Z-axis of the coordinate system Σv1 coincides with the direction of the visual line 40.

The direction of Z-axis of the coordinate system Σv1 on the coordinate system Σf is calculated when the process for movement to the reference point is completed. In particular, (W, P) components of an Euler angle (W, P, R) representing the orientation of the coordinate system Σv1 on the coordinate system Σf are calculated.

To this end, the translation according to step T4 is executed. In the translation, the manipulator 1a positioned at a first position is moved, without changing the orientation of the camera, to a second position where the distance between the camera and the target 31 is different to that at the first position (see an arrow A in FIG. 6). Numerals 4a and 4b in FIG. 6 indicate the camera before translation and after translation, respectively.

Steps T5 and T6

After the translation in step T4, in general, the image of the target 31 is deviated from the center point M of the display (or the center point of the light receiving surface). Therefore, the above process for movement to the reference point as described regarding step T2 is executed again (step T5), whereby the image of the target 31 coincides with the point M again. When the step T5 is completed, a position Qf2 of the coordinate system Σf relative to the robot coordinate system Σb is obtained and stored (step T6).

Step T7

The orientation of the visual line 40 is represented by a straight line extending from the position Qf1 calculated in step T3 to the position Qf2 calculated in step T6. The Euler angle (W, P, R) representing the orientation of the coordinate system Σv1 relative to the coordinate system Σf may be calculated as follows:

$$W = \tan^{-1}\left(\frac{-dY}{\sqrt{(dX)^2 + (dZ)^2}}\right)$$

$$P = \tan^{-1}\left(\frac{dX}{dZ}\right)$$

$$R = 0$$

where dX, dY and dZ denote components of the distance between the positions Qf1 and Qf2 on the coordinate system Σf before the translation of the manipulator in step T4.

The coordinate system Σv1 may be calculated by the above equations and, the orientation of the visual line 40 coincides with the direction of Z-axis of the coordinate system.

Steps T8-T11

Figure 7A:
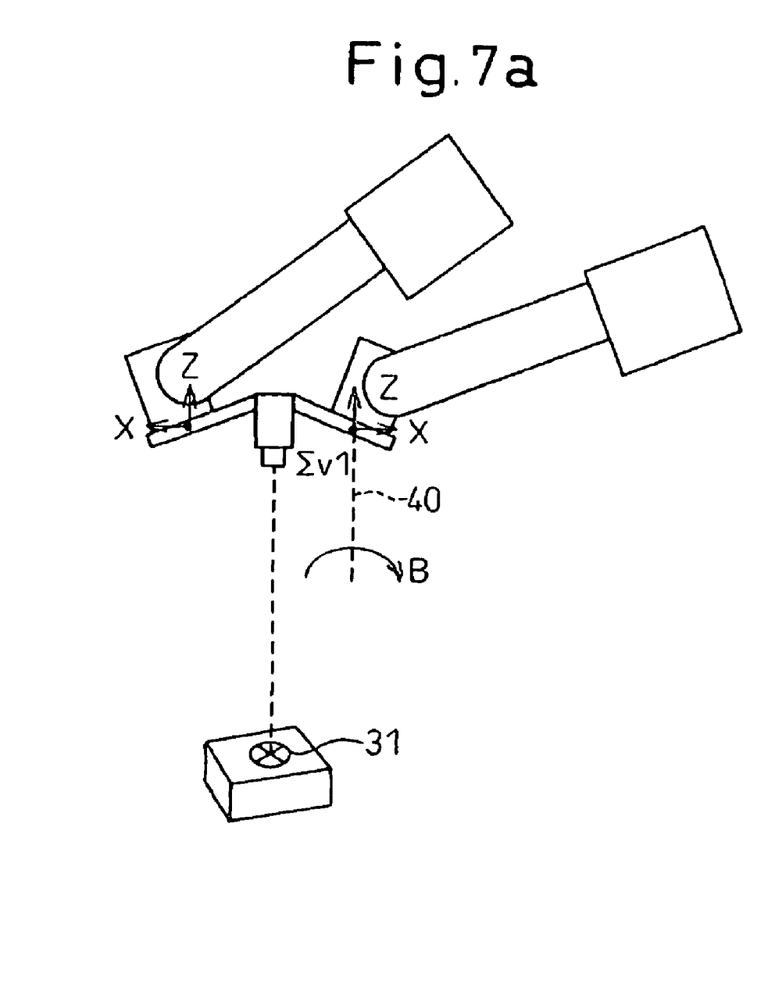
FIGS. 7a and 7b are explanatory diagrams of the process of step T8 and, the former illustrating a rotational movement of a coordinate $\Sigma v1$ and the latter illustrating a relation between the rotational movement and a coordinate $\Sigma v2$, respectively.
Figure 7B:
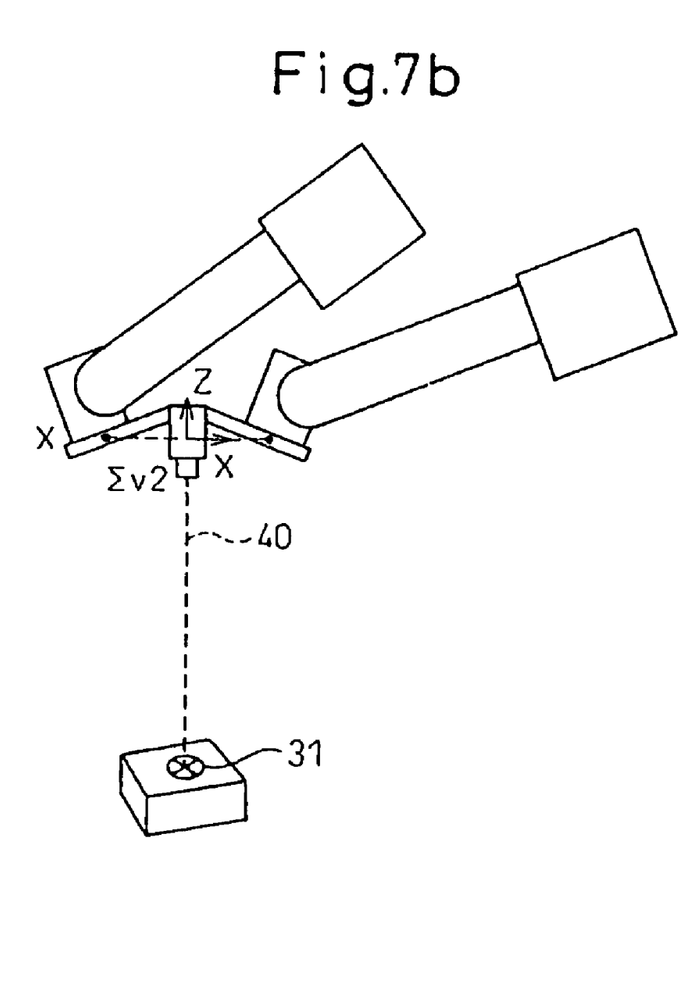

As the orientation of the visual line 40 is calculated in step T7, the following steps are for calculating the position of the visual line. FIGS. 7a and 7b are explanatory diagrams regarding the steps. In FIG. 7b, a coordinate system Σv2 corresponding Σv shown in FIG. 2 represents the position and the orientation of the visual line 40 and satisfies following conditions:

(iii) The origin of the coordinate system Σv2 is positioned on the visual line 40.

(iv) The direction of Z-axis of the coordinate system Σv2 coincides with the direction of the visual line 40.

The orientation of the visual line 40 has already calculated as the direction of Z-axis of the coordinate system Σv1 (see FIG. 7a) and, the direction of Z-axis of the coordinate system Σv2 coincides with the direction of Z-axis of the coordinate system Σv1. In order to determine the origin, the manipulator is moved such that the position Qf1 is rotated by 180 degree about Z-axis of the coordinate system Σv1 (step T8), then, the above process for movement to the reference point is executed again (step T9). FIG. 7a shows a condition in which this rotation (see an arrow B) and the process for movement to the reference point are completed and FIG. 7b shows the position of the origin of the coordinate system Σv2. The position of the origin of the coordinate system Σv2 is determined as a middle point of the points of the coordinate system Σf before and after the rotation.

Concretely, when the above rotation is completed, the position Qf3 of the coordinate system Σf is obtained and stored (step T10). The origin of the coordinate system Σv2 is determined as a middle point of the positions Qf1 and Qf3.

The position of the origin (X, Y, Z) of the coordinate system Σv2 relative to the coordinate system Σf may be calculated as follows:

$$X = \frac{dX}{2}$$

$$Y = \frac{dY}{2}$$

$$Z = \frac{dZ}{2}$$

where dX, dY and dZ denote components of the distance between the positions Qf1 and Qf3 on the coordinate system Σf before the movement of the manipulator in step T8.

As the orientation of the coordinate system Σv2 coincides with the orientation of the coordinate system Σv1, the orientation and position of the coordinate system Σv2 relative to the coordinate system Σf before the movement of the manipulator in step T8 may be calculated (step T11). Hereinafter, a matrix for calculating the orientation and position of the coordinate system Σv2 is denoted by [V].

Steps T12-T15

Figure 8:
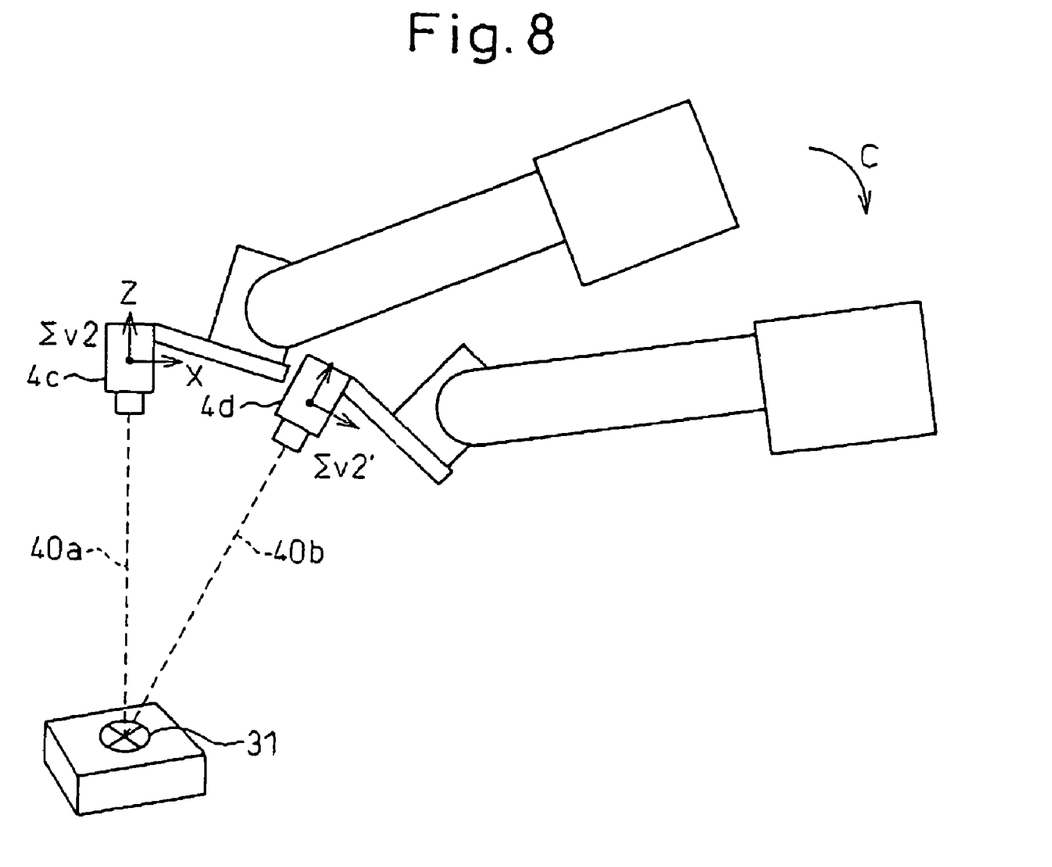
FIG. 8 is an explanatory diagram of the process for calculating the three-dimensional position of the target.

In the end, the steps for calculating a three-dimensional position of the target to be measured based on the orientation and the position of the visual line are executed. FIG. 8 is an explanatory diagram regarding the steps. The manipulator is inclined or moved such that the position Qf1 is rotated about Y-axis of the coordinate system Σv2 (step T12). Then, the above process for movement to the reference point is executed (step T13). In FIG. 8, a position where the inclination is completed is indicated with the visual line 40b. The coordinate system Σv2 is moved to Σv2'. In this regard, the visual line before the inclination is denoted by a numeral 40a. After step 13 is completed, a position Qf4 of the manipulator is obtained and stored (step T14).

The visual line relative to the coordinate system Σf may be calculated by the matrix [V] when the manipulator is positioned at the position Qf1. On the other hand, when the manipulator is positioned at the position Qf4, the visual line may be represented as below:

$$Qf1^{-1} \cdot Qf4 \cdot [V]$$

Based on the above equations, a suitable third arithmetic part of the main CPU 11 calculates a position of an intersection point of Z-axes of the coordinates Σv2 and Σv2' so as to determine the three-dimensional position of the target 31 (step T15).

As the steps described above are examples, the following modifications may be possible:

(a) In step TB (FIGS. 7a and 7b), although the manipulator is moved such that the position Qf1 is rotated by 180 degree about Z-axis of the coordinate system Σv1, the angle of rotation needs not to be 180 degree. Further, the movement of the position Qf1 may be a composite movement including rotation about Z-axis and another action.

(2) In step T12 (FIG. 8), although the manipulator is inclined or moved such that the position Qf1 is rotated about the Y-axis of the coordinate system Σv2, the movement of the position Qf1 may be a composite movement including rotation about an axis perpendicular to Z-axis and another action.

According to the present invention, when the target is measured by the light receiving device such as a camera or a PSD attached to the end of the manipulator of the robot, the visual line extending from the camera to the target may be easily obtained without calibration using an exclusive calibration plate of prior art.

Also, a geometric distortion of the light receiving device or a lens of the camera does not influence the measurement by calculating the position of the target based on data obtained when the image of the target is positioned at a predetermined position of the display. As a result, the measurement may be executed with high precision in a simple way.

As the visual line extending from the camera to the target may be easily obtained as mentioned above, a condition ready for measurement may be easily reconstructed even if the positional relation between the camera and the robot is changed such that the measurement cannot be carried out. In other word, a measuring system in which the camera may be attached to the end of the manipulator at need and may be detached after the measurement, may be constructed. It is advantageous that the robot may be used as one component of the measuring system only when the measurement is carried out and may be used for other applications in other time.

While the invention has been described with reference to specific embodiments chosen for the purpose of illustration, it should be apparent that numerous modifications could be made thereto, by one skilled in the art, without departing from the basic concept and scope of the invention.

The invention claimed is:

1. A measuring system for measuring a position of a target to be measured relative to a robot having a manipulator, the measuring system comprising:
   a light receiving device mounted to the manipulator;
   a control device for positioning the manipulator to an initial position; and
   an image processing unit for calculating a position of the target on a light receiving surface of the light receiving device imaged on the light receiving surface, the control device comprising:
   a first arithmetic part for calculating a distance of movement of the manipulator, by means of which the position of the target on the light receiving surface calculated by the image processing unit coincides with a predetermined reference point on the light receiving surface;
   a drive control part for moving the manipulator according to the distance of movement;
   a second arithmetic part for calculating at least one of a position and an orientation of a visual line of the light receiving device relative to a robot coordinate, based on position data of the manipulator with respect to a plurality of the initial position; and
   a third arithmetic part for calculating a three-dimensional position of the target relative to the robot coordinate, based on at least one of the position and the orientation of the visual line.

2. The measuring system as set forth in claim 1, wherein the reference point on the light receiving surface is positioned generally at a center of the light receiving surface.

3. The measuring system as set forth in claim 1, further comprising a judgment part for judging, after movement of the manipulator and before storing of the position of the manipulator, that the position of the target imaged on the light receiving surface of the light receiving device coincides with the reference point when the distance between them is within a predetermined error range.

4. The measuring system as set forth in claim 3, wherein the position of the manipulator after movement is reset as the initial position when the judgment part judges that the position of the target does not coincide with the reference point or the light receiving surface.

5. The measuring system as set forth in claim 1, wherein the second arithmetic part calculates the orientation of the visual line of the light receiving device relative to the robot coordinate based on at least two positions of the manipulator, the two positions being determined such that the orientations of the light receiving device at the two positions are same each other and the distances between the light receiving device and the target at the two positions are different with each other.

6. The measuring system as set forth in claim 5, wherein the second arithmetic part calculates the position of the visual line of the tight receiving device relative to the robot coordinate based on the orientation of the visual line and at least two positions of the manipulator, the two positions being determined by changing the orientation of the light receiving device by a motion including a rotation about an axis parallel to the orientation of the visual line.

7. The measuring system as set forth in claim 6, wherein the third arithmetic part calculates the three-dimensional position of the target relative to the robot coordinate based on the orientation and the position of the visual line and at least two positions of the manipulator, the two positions being determined by changing the orientation of the light receiving device by a motion including a rotation about an axis perpendicular to the orientation of the visual line.

8. The measuring system as set forth in claim 1, wherein the light receiving device is detachably mounted around the end of the manipulator, whereby the light receiving device may be attached around the end of the manipulator when measurement is carried out and may be detached after the measurement.

9. The measuring system as set forth in claim 1, wherein the light receiving device is detachably mounted around the end of the manipulator, whereby the robot may be used for measurement of a position of an object to be measured relative to robot by attaching the light receiving device around the end of the manipulator and, after the measurement, the robot may be used for an application other than the measurement by detaching the light receiving device.

10. The measuring system as set forth in claim 1, wherein the light receiving device is a camera for imaging a two-dimensional image.

11. The measuring system as set forth in claim 1, wherein the light receiving device is a position sensitive detector for calculating a position of a center of gravity of a distribution of received light.

12. A measuring method for measuring a position of a target to be measured relative to a robot having a manipulator, the method comprising:
- preparing a light receiving device mounted to the manipulator;
- positioning the manipulator to an initial position;
- calculating a position of the target on a light receiving surface of the light receiving device imaged on the light receiving surface;
- calculating a distance of movement of the manipulator, by means of which the position of the target on the light receiving surface coincides with a predetermined reference point on the light receiving surface;
- moving the manipulator according to the distance of movement;
- calculating at least one of a position and an orientation of a visual line of the light receiving device relative to a robot coordinate, based on position data of the manipulator with respect to a plurality of the initial position; and
- calculating a three-dimensional position of the target relative to the robot coordinate, based on at least one of the position and the orientation of the visual line.

* * * * *